J. KRALUND.
BEARING.
APPLICATION FILED SEPT. 30, 1912.

1,121,849.

Patented Dec. 22, 1914.

Attest:
O. Mitchell
Eugene W. ...

Inventor:
John Kralund
by Frank P. Wentworth
his Atty.

UNITED STATES PATENT OFFICE.

JOHN KRALUND, OF NEW YORK, N. Y., ASSIGNOR TO DOEHLER DIE CASTING COMPANY, OF BROOKLYN, NEW YORK, A CORPORATION OF NEW YORK.

BEARING.

1,121,849.  Specification of Letters Patent.  Patented Dec. 22, 1914.

Application filed September 30, 1912. Serial No. 723,006.

*To all whom it may concern:*

Be it known that I, JOHN KRALUND, a citizen of the United States, residing at the borough of Brooklyn, in the city of New York, county of Kings, and State of New York, have invented certain new and useful Improvements in Bearings, of which the following is a specification, reference being had therein to the accompanying drawings, which form a part thereof.

My invention relates to bearings, and the art or method of making same, and more particularly to a bearing having an outer shell of non-frangible metal, and a lining of anti-friction metal.

The main object of the invention is to provide a bearing composed of a shell of a compacted or compressed brass alloy formed to shape so as to provide a walled depression therein for the babbitt, a sheet of previously compacted Babbitt metal being seated within said depression to confine the entire edge of said babbitt in a manner to prevent the expansion thereof under the stresses of use. And a further object is to provide a bearing wherein both the outer shell and the Babbitt lining will not only be free from blow-holes, but will be so compacted as to insure higher efficiency as an anti-friction agent and greater durability without likelihood of contraction of the bearing upon the shaft, or breakage through the weakening of the structure resulting from wear.

The invention consists primarily in a bearing comprising an outer shell of rolled or drawn brass having a depression therein defined by a continuous wall, and a sheet of compacted Babbitt metal seated within said depression with its edges engaging the wall thereof, and in such other novel features of construction and combination of parts as are hereinafter set forth and described, all as more particularly pointed out in the claims hereto appended.

Figure 1:
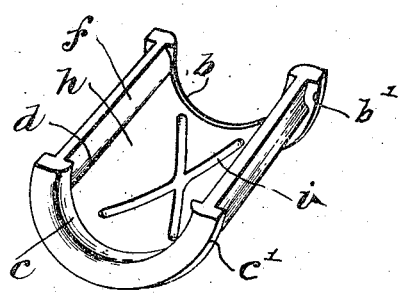
Figure 2:
Figure 3:
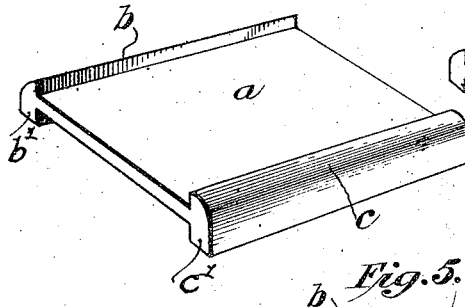
Figure 4:
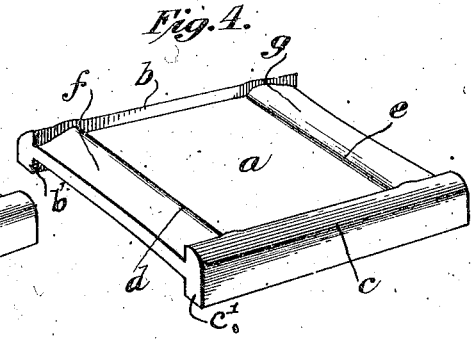
Figure 5:
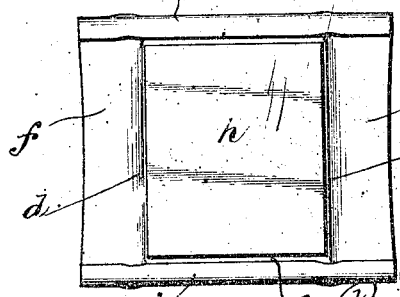

Referring to the drawings:—Figure 1 is a perspective view of a bearing embodying my invention; Fig. 2 is a cross section thereof; Fig. 3 is a perspective view of the rolled brass blank; Fig. 4 is a perspective view of said blank with the raised beads forming the depression and oil pockets pressed up; Fig. 5 is a plan view, with the Babbitt lining in position preparatory to giving the final forming operation to complete the bearing.

Like letters refer to like parts throughout the several views.

The bearing herein shown and described is especially adapted for light work such as for the shafts or journals of internal combustion engines, and other parts of automobiles, and light machinery, wherein, in addition to the characteristics desirable in other types of bearings, cheapness, compactness and durability are special desiderata. For this class of work integrally cast Babbitt bearings are now being extensively used, but in practice this type of bearing has not proven highly satisfactory because of the likelihood of the formation of blow holes in the castings; the inability to thoroughly compact the metal in casting, thus producing a coarse grained bearing; the liability of the bearings readily contracting upon the journal or shaft, owing to the expansion of the alloy; and the liability of the disruption of the casting under the stresses thereon, causing it to break down at the ends. In heavier work, these conditions are obviated by pouring babbitt in a suitable housing and finishing after so poured, or by providing interchangeable brasses. For light work such as that for which the bearing herein described is particularly adapted, these practices are impracticable, and are not followed.

By my invention, I provide a bearing which may be composed of two elements so united as to form a unitary structure, finished and applicable to a journal or shaft without requiring any fitting.

One of the elements is of Babbitt metal adapted to bear upon the journal or shaft, and the other element is a tough outer shell having a depression therein in which the Babbitt metal is seated, said depression being defined by a continuous wall engaging the edge of the Babbitt metal so as to confine and hold it against displacement, expansion, or breaking down under the stresses of use. The dimensions of this outer shell and its formation are such as to impart to the bearing the desired rigidity to avoid contracting of the bearing upon the shaft.

To secure high efficiency, both of the elements entering into the bearing are composed of previously rolled or drawn metal, thus insuring that compacting of the molecules thereof which is desirable as imparting durability to the structure, and higher efficiency as an anti-friction element.

In the accompanying drawings, I have shown a blank of drawn or rolled brass having a web $a$ and upon the opposite ends thereof flanges $b$ $c$ $b'$ and $c'$, extending substantially perpendicularly from both sides of said web. (See Fig. 3). The outer edges of the flanges $b$ $c$ are rounded or chamfered as shown to minimize the area of outer shell contacting with the bearing or shaft.

The web $a$ adjacent to the sides thereof, is formed upwardly as shown more particularly in Figs. 2 and 4, to form the beads $d$ and $e$, extending from flange $b$ to flange $c$, these beads being of substantially the same height as said flanges intermediate these beads. By this means a depression is formed upon the inner face of the blank, which depression is continuous and defined by the inner walls of the flanges $b$ $c$ and the beads $d$ and $e$. In forming up these beads $d$ and $e$, that portion of the web $a$ between them and the sides of the blank are inclined from the top of the bead to the plane of the web $a$ in a manner to produce oil pockets $f$ $g$ at the sides of the depression, which pockets have the old and well known function of minimizing the expression of the lubricant from the bearing.

The outer shell, being of brass, not only possesses anti-friction qualities, but wears more rapidly than Babbitt metal, so that with wear upon the babbitt, the bearing of the journal or shaft upon this outer shell instead of tending to cut the journal or shaft, would merely result in such wear upon said outer shell as will preserve the journal or shaft and bring it to bear upon the babbitt.

Seated within the recess defined by the walls of the flanges $b$ $c$ and beads $d$ $e$, is a sheet $h$ of previously compacted Babbitt metal, this Babbitt metal being fitted to the said depression by expanding it with the same simultaneously with the forming of the blank into semi-cylindrical form preparatory to finishing same.

By simultaneously bending or forming the outer shell and the Babbitt lining under heavy pressure, the metal of both of these elements is still further compacted and the Babbitt lining is so combined with the outer shell as to be substantially integral therewith.

Prior to bending, the sheet $h$ should be of dimensions slightly smaller than those of the depression, so as to permit the expansion of this sheet to place. As it is so expanded it is brought substantially flush with the top of the flanges $b$ $c$ and the beads $d$ $e$, and is forced tightly against the walls of these flanges and beads.

The flanges $b'$ and $c'$ have the functions of reinforcing the web $a$ and of serving as a means for positioning the bearing and holding it against movement in its housing.

In forming up the beads $d$ and $e$, it is impossible to form a right angle between these beads and the flanges $b$ $c$, but the space thus left will be adjacent to the oil pockets $f$ $g$ and will have no injurious effect upon any of the properties of the bearing.

In giving the final forming to the bearing, oil grooves $i$ are formed in the face of the sheet $h$, the clearance for expansion of the sheet $h$ permitting that displacement of metal necessary to the formation of these grooves.

The blank for the outer shell is first formed by rolling or drawing the brass to produce a strip of the desired conformation and density. This strip is then cut into blanks of the desired length, and subjected to heavy pressure in a forming press to raise the beads $d$ $e$ and form the oil pockets $f$ $g$, this step still further compacting the molecules of the brass or imparting greater density thereto.

The Babbitt metal is rolled into sheets to impart the proper density thereto, and is then cut into blanks of dimensions substantially an eighth of an inch less than the distances between the flanges $b$ $c$ and walls $d$ $e$. The blanks are then placed in the depression defined by the flanges $b$ $c$ and walls $d$ $e$ and the assembled structure formed into a semi-cylindrical shape under heavy pressure. The application of this pressure expands the sheet $h$ into engagement with the walls of the depression, forms the oil grooves $i$, and through the bending of the outer shell locks the lining or sheet $h$ within this depression in a manner to absolutely prevent the escape thereof. The application of the pressure also serves to still further compact the metal of the shell and of the lining therefor, and also serves to so intimately associate the outer shell and the Babbitt lining as to produce a substantially integral structure.

In a bearing made in accordance with my invention, all of the crushing strains upon the babbitt are transferred to the flanges $b$ $c$ and beads $d$ $e$, which being of tough and nonfrangible material, prevent any distortion or disruption of this babbitt.

Any tendency of the bearing to contract upon the journal or shaft through continued use, is eliminated through the resistance of the outer shell to distortion, great strength being secured by the formation of the flanges $b$ $b'$ $c$ and $c'$ along the ends of the outer shell.

Upon the final forming to a semi-cylindrical shape, the bearing is complete and finished, ready for application to a journal or shaft with the exception that it is necessary to grind off the side edges of the outer shell. The bearing comes perfectly true, as the dies for the final forming may be readily made perfectly true, and no finishing is required for the bearing surface after it leaves the final forming dies.

It is not my intention to limit my invention to the precise configuration of the depression in the outer shell, nor to use in connection with a semi-cylindrical bearing, it being apparent that the depression may take any suitable configuration so long as it is defined by substantially continuous walls, and may be in any form to adapt it to the configuration of any particular journal or shaft.

Having described my invention, what I claim as new and desire to have protected by Letters Patent, is:—

1. A bearing comprising an outer shell of rolled or drawn brass having a depression therein defined by a substantially continuous wall, and a sheet of compacted Babbitt metal seated in said depression with its edge engaging the walls thereof.

2. A bearing comprising an outer shell of rolled or drawn brass semi-cylindrical in form, and consisting of a central web, end flanges projecting therefrom, and beads drawn up from said web adjacent the sides thereof whereby a depression is provided defined by said flanges and said beads, and a sheet of compacted Babbitt metal seated in said depression with its edge engaging said flanges and said beads.

3. A bearing comprising an outer shell of rolled or drawn brass semi-cylindrical in form and consisting of a central web, end flanges projecting therefrom, and beads drawn up from said web adjacent the sides thereof, said web being inclined from each said bead to the side of said web whereby oil pockets are formed adjacent said depression, and a sheet of compacted Babbitt metal seated in said depression with its edge engaging said flanges and said beads.

4. A bearing comprising an outer shell of rolled or drawn brass semi-cylindrical in form and consisting of a central web, end flanges projecting from both sides thereof, and beads drawn up from said web adjacent the sides thereof and within said shell, and a sheet of compacted Babbitt metal seated in said depression with its edge engaging said inner flanges and said beads.

5. A bearing comprising an outer shell of rolled or drawn brass semi-cylindrical in form, and consisting of a central web, end flanges projecting therefrom, and beads drawn up from said web adjacent the sides thereof whereby a depression is provided defined by said flanges and said beads, and a sheet of compacted Babbitt metal seated in said depression with its edge engaging said flanges and said beads, the inner surface of said sheet of Babbitt metal being substantially flush with the tops of said flanges and said beads.

In witness whereof, I have hereunto affixed my signature, in the presence of two subscribing witnesses, this 26th day of September, 1912.

JOHN KRALUND.

Witnesses:
OTTO MUNK,
EUGENE UPRING.